United States Patent [19]

Rasmussen et al.

[11] Patent Number: 4,933,936

[45] Date of Patent: Jun. 12, 1990

[54] DISTRIBUTED COMPUTING SYSTEM WITH DUAL INDEPENDENT COMMUNICATIONS PATHS BETWEEN COMPUTERS AND EMPLOYING SPLIT TOKENS

[75] Inventors: Robert D. Rasmussen, Monrovia; Robert M. Manning, Pasadena; Blair F. Lewis, Altadena; Gary S. Bolotin, Sierra Madre; Richard S. Ward, Pleasanton, all of Calif.

[73] Assignee: The United States of America as represented by the Administrator of the National Aeronautics and Space Administration, Washington, D.C.

[21] Appl. No.: 85,833

[22] Filed: Aug. 17, 1987

[51] Int. Cl.$^5$ .............................................. H04J 3/02
[52] U.S. Cl. ............................... 370/85.9; 370/85.6; 370/85.4; 370/94.3; 340/825.5
[58] Field of Search ... 364/200 MS File, 900 MS File; 340/825.5, 825.52; 370/85, 86, 60, 94, 89; 371/36

[56] References Cited

U.S. PATENT DOCUMENTS

| 4,262,357 | 4/1981 | Shima | 370/60 |
|---|---|---|---|
| 4,399,531 | 8/1983 | Grande et al. | 370/94 |
| 4,616,312 | 10/1986 | Uebel | 371/36 |
| 4,627,045 | 12/1986 | Olson et al. | 370/16 |
| 4,689,786 | 8/1987 | Sidhu et al. | 370/85 |
| 4,745,593 | 5/1988 | Stewart | 370/60 |
| 4,759,009 | 7/1988 | Casady et al. | 370/86 |
| 4,768,190 | 8/1988 | Giancarlo | 370/86 |
| 4,792,945 | 12/1988 | Mark | 370/85 |
| 4,805,168 | 2/1989 | Kato | 370/85 |
| 4,805,170 | 2/1989 | Fergeson et al. | 370/89 |

FOREIGN PATENT DOCUMENTS 2121637  5/1982  United Kingdom ............... 455/612

OTHER PUBLICATIONS

Computer Communications, vol. 2, No. 4, Aug. 1979, "Survey of Computer Communications Loop Networks"; B. K. Penney et al.

Primary Examiner—Douglas W. Olms
Assistant Examiner—Min Jung
Attorney, Agent, or Firm—Thomas H. Jones; John R. Manning; Charles E. B. Glenn

[57] ABSTRACT

This is a distributed computing system providing flexible fault tolerance; ease of software design and concurrency specification; and dynamic balance of the loads. The system comprises a plurality of computers each having a first input/output interface and a second input/output interface for interfacing to communications networks each second input/output interface including a bypass for bypassing the associated computer. A global communications network interconnects the first input/output interfaces for providing each computer the ability to broadcast messages simultaneously to the remainder of the computers. A meshwork communications network interconnects the second input/output interfaces providing each computer with the ability to establish a communications link with another of the computers bypassing the remainder of computers. Each computer is controlled by a resident copy of a common operating system. Communications between respective ones of computers is by means of split tokens each having a moving first portion which is sent from computer to computer and a resident second portion which is disposed in the memory of at least one of computer and wherein the location of the second portion is part of the first portion. The split tokens represent both functions to be executed by the computers and data to be employed in the execution of the functions. The first input/output interfaces each include logic for detecting a collision between messages and for terminating the broadcasting of a message whereby collisions between messages are detected and avoided.

33 Claims, 5 Drawing Sheets

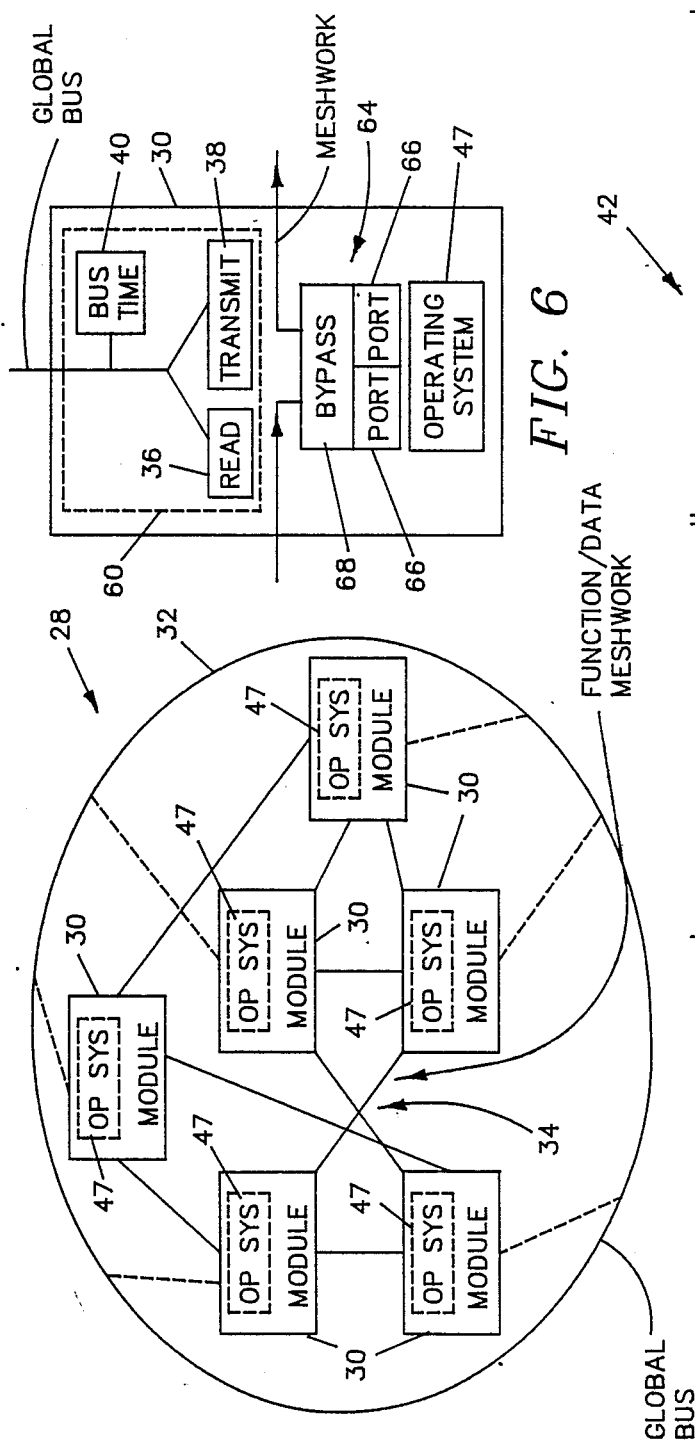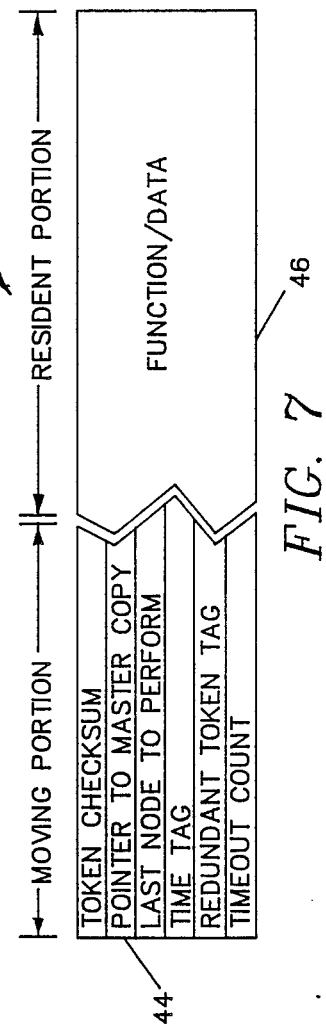

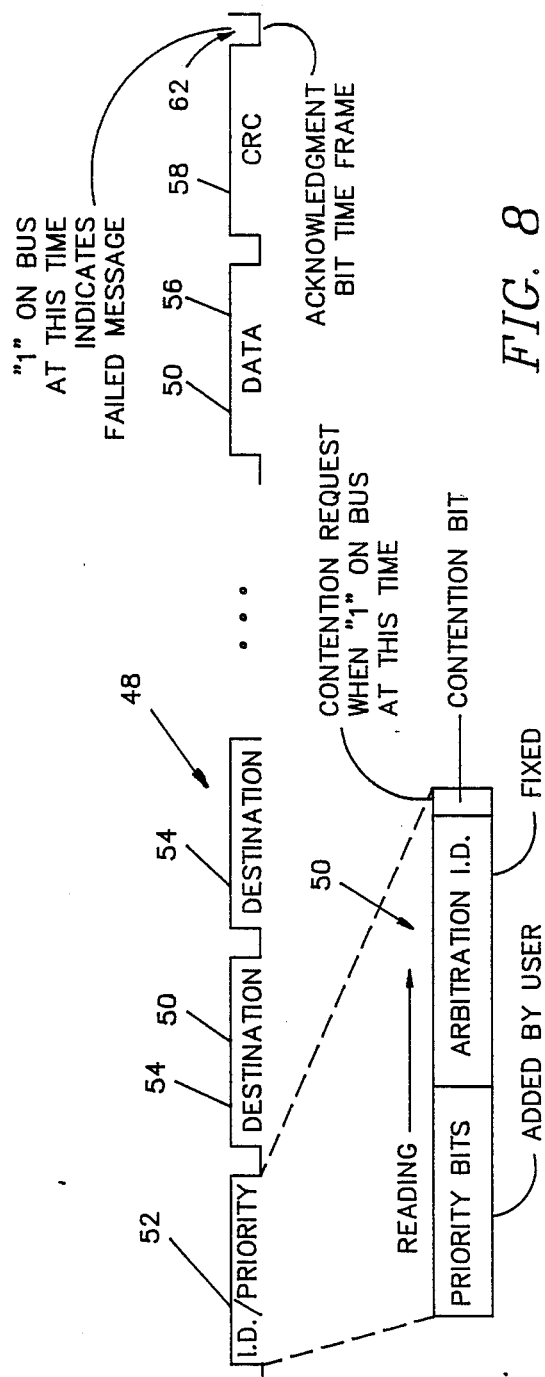
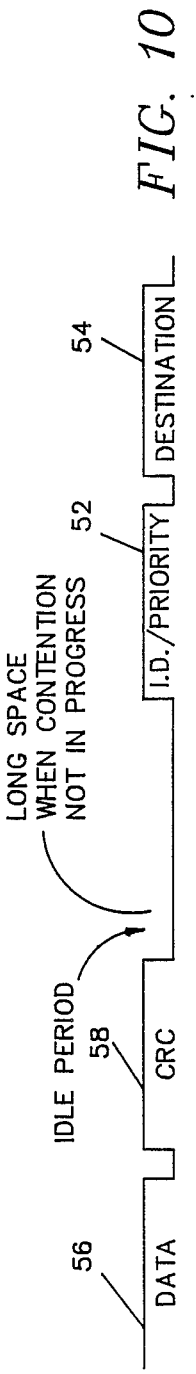
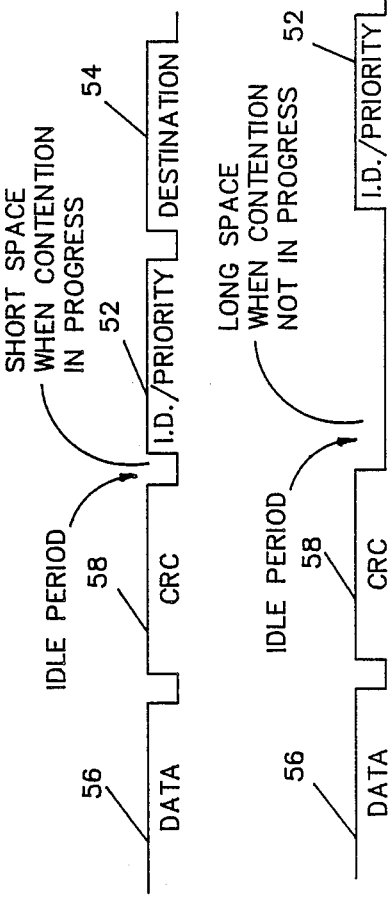
FIG. 8
FIG. 9
FIG. 10

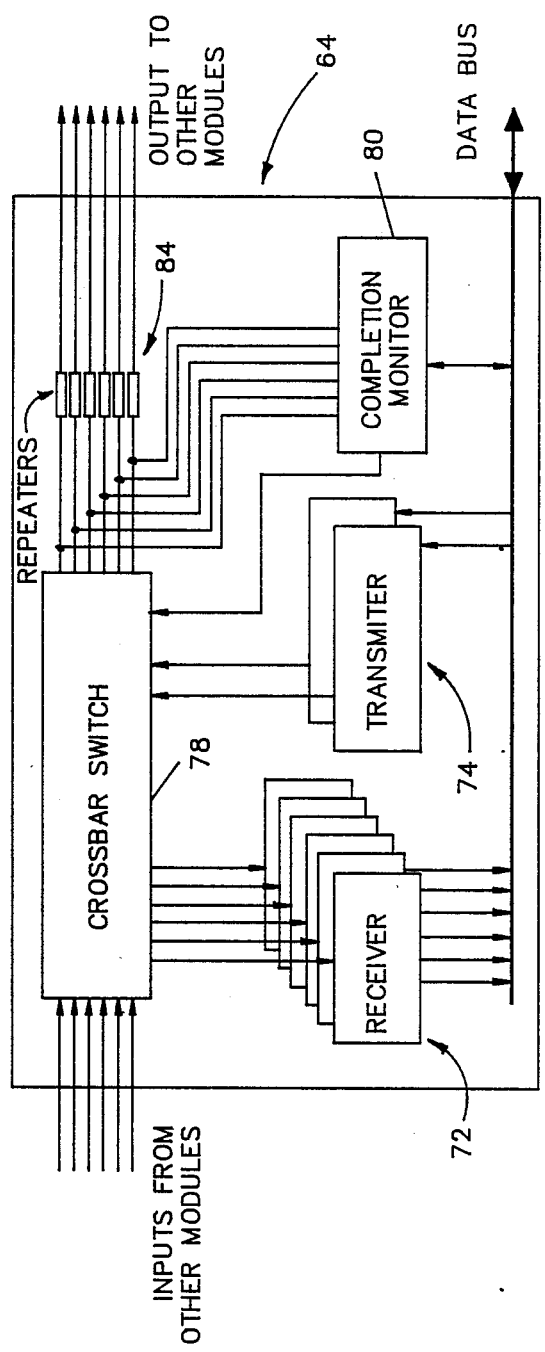
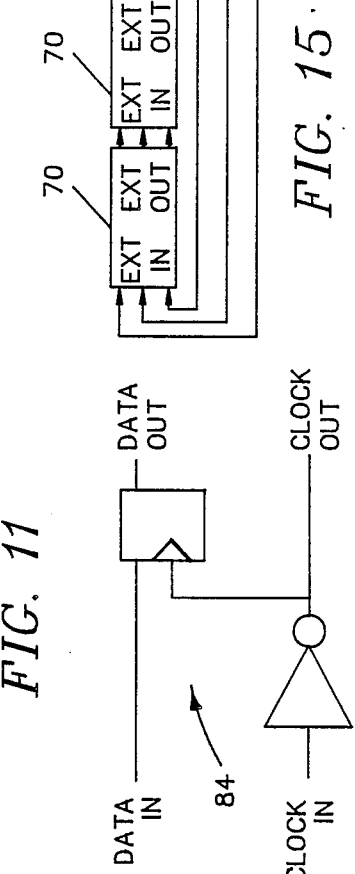
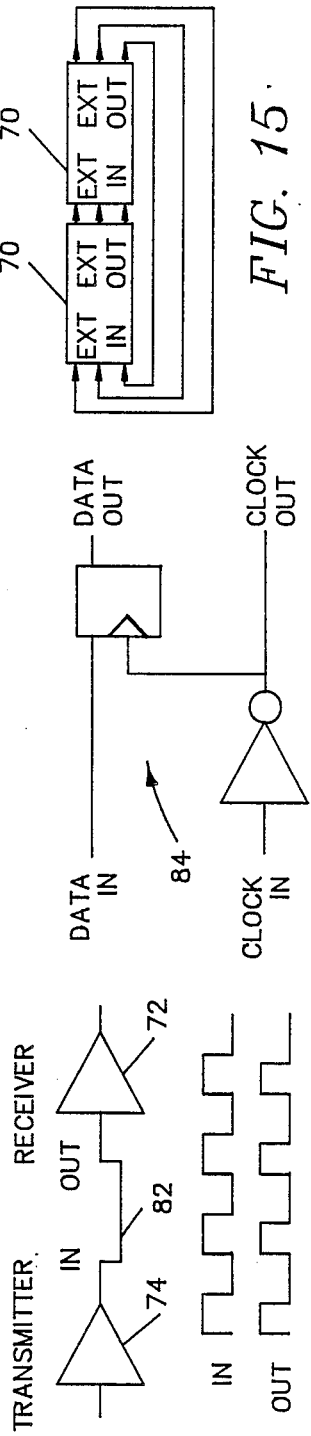

DISTRIBUTED COMPUTING SYSTEM WITH DUAL INDEPENDENT COMMUNICATIONS PATHS BETWEEN COMPUTERS AND EMPLOYING SPLIT TOKENS

ORIGIN OF THE INVENTION

The invention described herein was made in the performance of work under a NASA contract and is subject to the provisions of Public Law 96-517 (35 USC 202) in which the Contractor has elected not to retain title.

TECHNICAL FIELD

A distributed computing system comprising a plurality of interconnected computers operating in a novel distributed variation of dataflow execution mode to provide flexible fault tolerance, to ease software design and concurrency specification, and to dynamically balance the loads; a distributed operating system resident on all computers; a real-time multiple-access global bus using Lanning code arbitration with deterministic access delay; and a point-to-point circuit-switched network.

DESCRIPTION OF THE PRIOR ART

Future spacecraft computers will require greater autonomy, flexibility, fault tolerance and higher throughput. The necessary solution is a new flexible computational system that will support a wide range of instruments, attain a tolerable arbitrary level of fault and damage tolerance, and provide a greater range of throughput capability. Designers of future spacecraft systems will confront a variety of new applications in onboard computing. The traditional roles of spacecraft computers are expanding to encompass tasks previously assigned to ground based systems. Increased autonomy is becoming a major goal at all levels to improve both efficiency and reliability. Greater flexibility will be needed to accommodate evolving requirements for existing spaceborne systems. Also, new instruments and engineering subsystems will require greater computational throughput.

Considering the range of payloads on such diverse systems as the Space Station, Earth Observing System, planetary spacecraft, and a host of Space Shuttle experiments, there exists the potential need for many hundreds of general purpose computing systems. The Space Station alone may require dozens, if not hundreds, of computers when payloads are included.

Reliability issues include the operating environment as well as fault and damage tolerance. One environmental issue that has plagued current generation computing components is their intolerance to ionizing radiation damage and to a single event upset (SEU). SEUs arise in small feature size parts due to trapped ions, solar flares and cosmic rays. The ability for space systems to evolve to a newer, high density technology such as VHSIC is a daunting problem. Solutions, in many cases, may have to come from architectural restructuring in new and novel ways.

Computer system architectures have various facets. There is the structure of the computers themselves, i.e. one or many. Operating systems and the associated support software can be configured in many ways. Then there is the consideration of how multiple computers will communicate with one another. Early systems employed one large computer doing the work on a batch input basis. Later, data acquisition and processing functions were made "real time" in many cases but still employing one large computer to do the work. Sometimes, priority levels were assigned to the various tasks within the computer and the tasks shared the computing ability of the hardware on an unequal basis with the more important tasks being done first and the tasks of lesser importance being done on a time available basis. The advent of multi-processors (i.e. multiple computers linked together to perform a common function) created many new problems for the computer architects. Particularly sensitive in the military and space environments are the concepts of fault tolerance and "graceful degradation"; that is, with one computer, when it is not working, nothing gets done, but, with multiple computers, if a portion of the computing capability is inoperative for any reason, it is expected that the remaining capability will take over at least critical functions and keep them operational.

A few examples of various architectural approaches known in the computer art are depicted in simplified form in FIGS. 1-4. FIG. 1 depicts a contemporary token ring network 10 wherein a plurality of computer nodes 12 are disposed along a circular communications path 14. To send messages between one another, each node samples the data on the path 14 looking for a "token" (i.e. a particular bit pattern not otherwise appearing) signifying the end of a message. When the token is located, the node 12 puts its message on the path 14 immediately following the found token and appends a new token at the end of its message to flag the end thereof. If a token is not found within a given time, the node 14 puts its message on anyway assuming network failure of some sort and hopes for the best. In such case, the network 10 degrades into what is referred to as a "contention" network wherein each node simply puts its messages on the network at will and if they are not acknowledged by the receiver as having been properly received within a given time, repeats the process until successful sending and receiving has been achieved. Some inter-computer communications networks operate on that basis all the time. Obviously, in either the token ring approach or the contention approach, some nodes can dominate the communications path and prevent other nodes from communicating at all. All in all, such approaches which may be acceptable in some ground based general computer systems are not acceptable for systems employed in the space applications being considered herein.

A common prior art approach to both hardware and software interconnection and hierarchy is depicted in FIG. 2. In this case, a plurality of task-oriented, working level computers 16 are interconnected in a multi-processor environment. The software in the computers 16 is primarily that required to perform user functions or tasks such as data acquisition and processing. Supervising computers 18 are connected to monitor the computers 16 and contain operating system type software for assigning and reassigning tasks to the computers 16 for the purpose of distributing the workload for maximum system efficiency and to accomplish fault tolerance and graceful degradation as necessary. Typically, there is a master computer 20 which has ultimate control of the whole system. The master computer 20 provides the system interface and is used to start up and configure the system in general, among other tasks. As can be appreciated, such an approach is complex to create, complex to debug, and subject to high overhead problems. Moreover, there must be redundancy on the supervising and master computer levels to prevent system failure if one of those computers fails or is destroyed.

FIG. 3 depicts a data-driven approach to computer architecture which is known in the art. Each task 22 is caused to execute when the data from the preceding tasks 22 required for its execution are provided by those preceding tasks.

Finally, FIG. 4 depicts a basic eight node element of a so-called "hypercube" approach to computer architecture wherein as many as 64,000 individual computing nodes 16 are interconnected. The hypercube is characterized by implementing an approach such as that depicted in FIG. 2. The nodes 16 are interconnected by a first communications network 24 over which the nodes 16 transfer their data, etc. The supervising computers 18 are connected to the nodes 16 by a second communications network 26 over which reconfiguration and redistribution/reassignment of task instructions are sent so that the same communications paths are not employed for the two different purposes.

Many fault tolerance approaches with prior art computer architectures are hardware intensive, requiring elaborate hardware synchronization mechanisms. Even with this investment in hardware, the application software is often subject to constraints, and requires additional overhead to support the underlying architecture. The degree of fault tolerance achieved in these designs is dictated by the architecture, not by the needs of the software designer. Furthermore, damage tolerance is not currently achievable by the same mechanisms which provide fault tolerance, without significant performance penalties.

Finally, there is the issue of software cost and reliability. Very large real-time programs for uniprocessors are difficult enough to write and test. Distributed computing systems aggravate the problem by adding topological considerations. To be fully effective, future multiprocessing systems must consider software development issues.

What is required is a single architectural concept to deal with these requirements. The intent is to provide the spacecraft system designer with a system capable of handling a general class of computing applications, e.g., payload controllers, smart sensors, robotics, engineering subsystems and moderate throughput signal processing. The required capability is not intended to supplant special purpose hardware such as high throughput signal processors, or incircuit microprocessors.

There is presently no flexible design which will support arbitrary levels of fault and damage tolerance and provide a range of throughput capability through modularity and parallelism. There is also no present software environment which deals cleanly with the issues of concurrency, productivity, reliability, and fault tolerance while permitting the generation of applications software using commercially available tools.

DISCLOSURE OF THE INVENTION

The present invention has achieved its desired objectives through use of modularity and parallel computation, based on a multiprocessor system interconnected by a global bus and an independent data network, employing a distributed operating system operating in dataflow mode of task execution. A multiprocessor architecture was chosen since it offers easy expandability and also provides the necessary basis for a fault-tolerant and gracefully degradable system. More specifically, the present invention is a multicomputer system consisting of loosely coupled processor/memory pairs connected by global and point-to-point communication systems. This approach is preferable to a shared memory implementation which would require hardware intensive approaches to fault tolerance.

More particularly, this invention is a computer system comprising, a plurality of computers, each computer having first input/output interface means for interfacing to a communications network and second input/output interface means for interfacing to a communications network, each second input/output interface means including bypass means for bypassing the associated computer with a bit stream passing through the second input/output interface means; global communications network means interconnecting respective ones of the first input/output interface means for providing respective ones of the computers with the ability to broadcast messages simultaneously to the remainder of the computers; and, meshwork communications network means interconnecting respective ones of the second input/output interface means for providing respective ones of the computers with the ability to establish a communications link with another of the computers through the bypass means of the remainder of the computers.

The preferred embodiment includes several additional features to accomplish the overall objectives thereof. Specifically, each computer is controlled by a resident copy of a common operating system. Communications between respective ones of the computers is by means of split tokens each having a moving first portion which is transmitted from computer to computer and a resident second portion which is disposed in the memory of at least one of computers and wherein the location of the second portion is part of the first portion. As a major point of novelty, the split tokens represent both functions to be executed by computers and data to be employed in the execution of the functions.

Additionally, the first input/output interface means each includes means for detecting a collision between messages being broadcast over the global communications network means and for terminating the broadcasting of a message in favor of a message with superior right to use of the global communications network means whereby collisions between messages from a plurality of computers are detected and avoided.

Additionally, the bypass means of the second input/output interface means at each computer includes a receiver for receiving inputs to the associated computer, a transmitter for transmitting outputs from the associated computer, a plurality of inputs and outputs connected to respective ones of the inputs and outputs of others of computers interconnected by the meshwork communications network means, and crossbar switch means interconnecting the inputs and the outputs for bypassing the receiver and the transmitter at the associated computer and for interconnecting one of the plurality of inputs to one of the plurality of outputs whereby a bypass link between the ones of the plurality of inputs and outputs is established; and, the bypass means of the second input/output interface means at each computer includes means for sensing a unique signal on the meshwork communications network means indicating that the bypass link is to be terminated and for causing the crossbar switch means to open the bypass link when the unique signal is sensed.

DETAILED DESCRIPTION OF THE DRAWINGS

FIG. 5 is a simplified block diagram drawing of the computer system of the present invention showing the operating system duplicated in each of the computer modules, the modules connected to a global bus for intermodule communication, and the modules loosely interconnected by a meshwork providing module-to-module linking for the transfer of data and functions.

FIG. 6 is a simplified block diagram of a representative module in the present invention showing the connection to the global bus, the connection to the meshwork providing module bypass for intermediate modules, the providing of global time via the global bus, and the common operating system resident in each of the modules.

FIG. 7 is a drawing showing how the function/data tokens employed in the present invention are split into moving and resident portions.

FIG. 8 is a drawing of the structure of a typical message as broadcast over the global bus in the present invention.

FIG. 9 is a drawing showing the intermessage structure of message according to FIG. 8 when there is a contention between modules in progress for the global bus.

FIG. 10 is a drawing showing the intermessage structure of message according to FIG. 8 when there is not a contention between modules for the global bus.

FIG. 11 is a block diagram of the meshwork interface.

FIG. 13 is a drawing showing the effect of interconnecting wires between the transmitters and receivers in narrowing the data pulses and changing their orientation to the clock. FIG. 14 is a circuit diagram of the repeaters employed in the present invention to eliminate the problem shown in FIG. 13.

FIG. 15 is a block diagram showing how meshwork controllers can be interconnected to increase their capacity according to the present invention.

DETAILED DESCRIPTION OF THE INVENTION

Figure 2:
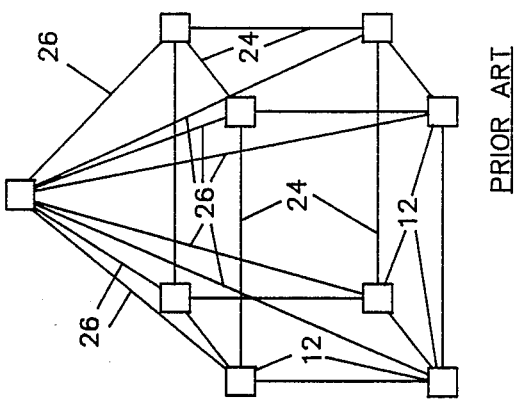
FIG. 2 is a simplified drawing representing a prior art computer network in which multiple levels of software system control are implemented.

The main difficulties which arise in implementations for real-time applications on interconnected multiple computer systems are the distribution of event data in a timely fashion as well as software synchronization and scheduling. Other issues include an efficient interconnecting communication system, methods for distribution of control, task migration, support for fault tolerance, and input/output handling. The present invention employs a concurrency technique which offers solutions to most of these problems in the form of low resolution dataflow.

Dataflow is central to the architecture of the present invention. The order in which various functions are performed and the means by which data and functions are associated is fundamental to a computer's architecture. In a von Neuman architecture, instruction execution is directed by an instruction pointer which passes control from one function to the next. There is no inherent concurrency. Data is identified through its location in memory.

In a dataflow architecture, the execution of each function is enabled by the presence of the data required by that function. Data is encapsulated in tokens which identify the functions to which the data is destined. The use of the token by a function consumes the token. Functions produce results in the form of new tokens. Tokens are created, used (read) and then destroyed. There is no correspondence between a data item and its location in memory because of the encapsulation of data within tokens. Dataflow functions are thus constrained to be functions with no "side effects".

In the present invention, a particular function becomes ready for execution (fireable) as soon as it has received all of the necessary input tokens. Therefore, several functions may be fireable at any moment. If the functions are distributed over the processing units of the system, all fireable functions are executed at the earliest opportunity. Hence, the maximum concurrency potential in the algorithm is extracted.

Dataflow systems can be categorized by the granularity of their data and functions. In a high resolution dataflow system, data items are quantities such as numbers and booleans. Correspondingly, functions consist of arithmetic and logical operations, simple decisions, and so on. A high resolution dataflow program consists of a very large number of functions requiring a large number of special purpose processors to extract all of the potential concurrency of a program.

Lower resolution dataflow implies increased complexity of both data structures and functions. In a low resolution system as implemented by the present invention, data might consist of lists, arrays, and other such data structures. Similarly, functions could be complex routines such as sorting, and matrix inversion. Low resolution dataflow extracts less potential concurrency from an algorithm, but it does this with less scheduling and synchronization overhead. This is an important consideration in the achieving of the overall objectives of the present invention.

Figure 3:
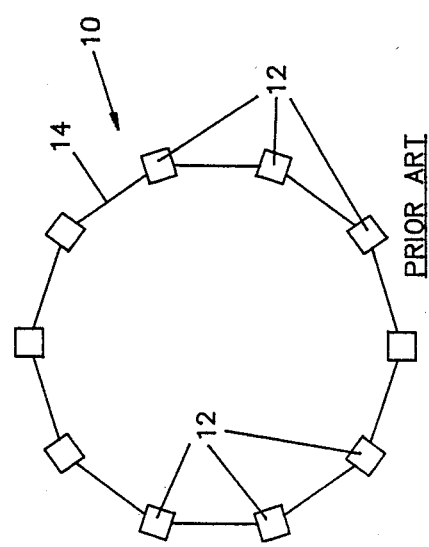
FIG. 3 is a simplified drawing representing a prior art approach of driving a system by data tokens.
Figure 12:
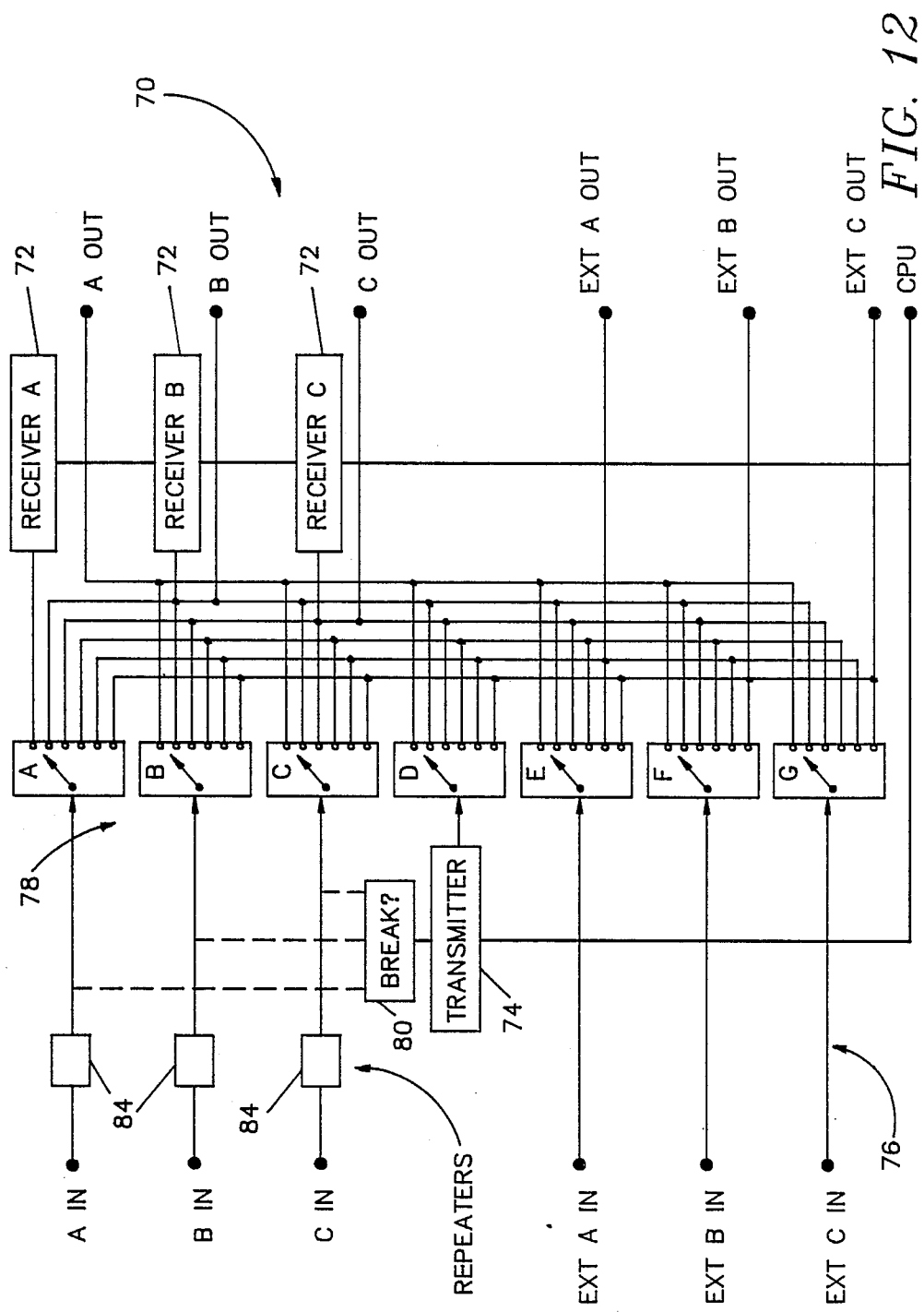
FIG. 12 is a block diagram of the meshwork controller.

Dataflow programs can be represented in a number of ways. Languages such as LUCID are similar in appearance to conventional high-level languages and are designed to ease the translation of source code into dataflow primitives. A dataflow program can also be expressed as a directed graph in which each node represents a function, and connecting arcs define the paths of tokens from source to destination. This is substantially an implementation of the representation of FIG. 3.

Many features of low resolution dataflow are appealing from an architectural point of view. For example, there is the ease of concurrency expression. In a dataflow graph, concurrency potential exists both explicitly in the form of parallel paths which may be executed simultaneously, as well as implicitly through pipelining in which the processing of consecutive inputs may overlap. Dataflow gracefully handles transient loadings which might arise from asynchronous inputs or variable computing times. Tagged dataflow systems provide automatic queuing of all data without the necessity of providing a separate queue for each input to a function. The absence of side effects and a one-to-one relationship of inputs to outputs makes programs easier to integrate and debug. This is a proven method of increasing software reliability. A graph may be verified with little regard to the algorithms which implement its functions. Any problems traced to the improper execution of a function can be debugged solely at the function level, and off-line. There is no sense of history in a function and all functions are operationally isolated form each other. The requirements on a function may be specified with no reference to other elements of the program, except for adherence to the structure of the tokens passed from one function to the next. Dataflow functions may be tested in isolation and changed without regard to the remainder of the program as long as the data structure conformity is preserved.

With low resolution dataflow, consecutive inputs to a function may be processed in separate processing units without re-entrancy concerns. There is no implied context to save or transfer. If any "memory" is required from one function activation to the next, the context must be explicitly carried by loops in the dataflow graph. Having thus described the basic attributes of the approach implemented by the present invention, the specifics of it will now be addressed in greater detail.

As depicted in the simplified drawing of FIG. 5 and generally indicated as 28 therein, the computer system of the present invention consists of clusters of computer modules 30 interconnected by two different communication mechanisms, the global bus 32 and the meshwork 34.

Figure 4:
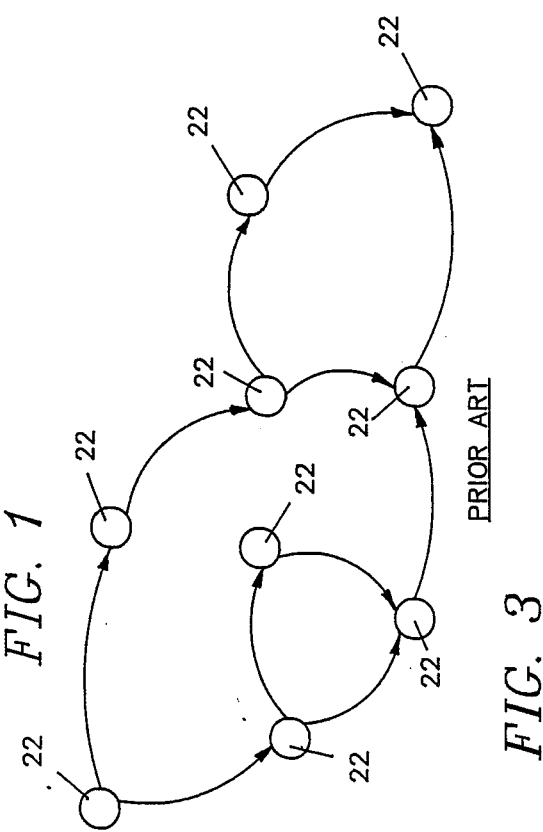
FIG. 4 is a simplified drawing representing a socalled hypercube in which multiple computers are interconnected with a data network and connected to a supervisory computer via a separate control message network.
Figure 1:
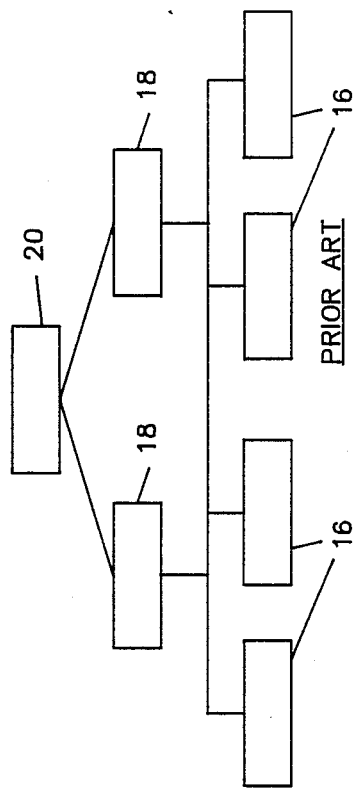
FIG. 1 is a simplified drawing representing a prior art token passing ring computer network.

Each module 30 is a self-contained computer with ports connecting it to the meshwork 34 and the global bus 32 as depicted in FIG. 6. The global bus 32 and meshwork 34 as employed in the present invention are novel in their own regard and will be considered in detail later herein. Each module 30 operates autonomously. This is a major point of novelty of the present invention. Additionally, the operating system is replicated on all the modules, resulting in a fully distributed system—which is also a major point of novelty of the present invention over the prior art. A module 30 also contains timers, interrupt controllers, and the capability for general purpose memory mapped I/O via an extension bus as known in the art. By attaching special purpose boards to the extension bus, the capabilities of a module 30 can be enhanced in the usual way. For example, a mass storage device such as a digital tape recorder with limited or no computing capability could be directly connected to a module 30. The system can also support a non-homogeneous node configuration where individual nodes have unique capabilities such as I/O, storage, or computational capability. Another module enhancement might be an array processing unit, where a module 32 would serve as a front end, having the role of exchanging input and output tokens over the meshwork 34. This type of capability enhancement and the use of so-called "servers", and the like, in a networked system are well known in the art and, per se, form no point of novelty of the present invention The global bus 32 is a broadcast bus used for operating system and software synchronization functions. It should be noted at this point that "software synchronization" refers to coordination of activities for example, not starting one activity until a previous activity upon which it depends is finished. It is not the same as hardware synchronization involving clock signals (the global bus, for example, uses an asynchronous protocol), nor is it the same as synchronization of the global bus times which involve a combination of software and hardware mechanisms. A cluster of modules 30 share a common global bus 32. The meshwork 34 is a circuit-switched point-to-point communications network, used to transport data between modules 30. Every module 30 is connected to a number of other modules 30 in the system, in a topology that best suits a particular application; that is, the meshwork 34 does not require a "regular" pattern of interconnection as in the case of the typical prior art inter-computer communications network such as those described with respect to FIGS. 1, 2 and 4. Rather, modules 30 having a high degree of potential inter-module communication can be directly connected while modules 30 having little or no inter-module communication traffic can be connect so as to require connection through a more circuitous route. The meshwork 34 is also used to communicate between clusters of modules 30. It should be noted with particularity that the present invention incorporates two distinct communication pathways. The global bus 32 is a carrier sense multiple access serial broadcast bus with collision detection/avoidance and equal access capability on a priority basis to prevent module lockout from access to the bus. The meshwork 34 is a point-to-point circuit-switched communications network with module bypass capability.

THE GLOBAL BUS

The global bus 32 is used for token announcement and synchronization. It is characterized by its broadcast capabilities, and transmission integrity mechanisms. As depicted in simplified form in FIG. 6, the interface at each module 30 to the global bus 32 employs read circuitry 36 and transmit circuitry 38. There is also a global bus time 40 available which is synchronized across the bus 32 so that each module 30 can get a common bus time for time tagging, and such. There may be more than one global bus 32 per module 30 as when multiple clusters are interconnected; however, for purposes of simplicity in the discussion herein, only one bus 32 is shown. Each time a node in a dataflow graph completes its assigned task, it broadcasts to all the participating modules 30 over the global bus 32 that is has completed the task, as well as the identification of the tokens that it produced The actual data, encapsulated in one or more tokens, remains resident in the module 30 where it was produced A module that requires the use of one or more of the tokens just produced will request and acquire them over the much higher bandwidth meshwork 34. This unique approach of the present invention is depicted in simplified form in FIG. 7 and is worthy of note by a brief digression at this point.

As depicted in FIG. 7, the concept of a "token" in the present invention is different from the traditional approaches to a token such as, for example, that described above with respect to prior art token passing ring communications networks. In the present invention, the token is "split"; that is, a token 42 comprises a moving portion 44 and a resident portion 46. As symbolically represented in the figure, the token 42 can be thought of as a whole which has been split into two different sized portions. This approach to a token is substantially the same for function tokens as well as data tokens. It should be noted in passing at this point that while data tokens are known in the art, the concept of a function token is a unique and novel aspect of the present invention which permits it to achieve many of its objectives. In either. case, the moving portion 44 is a small message packet containing information about the function/data contained in the resident portion 46. For each function, there is a master copy of the code defining it in one or more of the modules 30. For data, the resident portion is located in the module 30 which produced it. It is the moving portion 44 which is broadcast on the global bus 32. As indicated in FIG. 7, the moving portion 44 as transmitted to and as received by the modules 30 includes such necessary information as a checksum of the moving portion 44 for message checking by recipient modules 30, a pointer to the master copy of functions or data, a time tag indicating the time of creation (for numerous purposes), etc. The resident portion remains in its module 30 and a copy is only transferred to another module 30 for use if necessary for function performance as will be discussed shortly in greater detail.

As a further major point of novelty of the present invention as mentioned briefly earlier, the global bus 32 is a serial, multiple access broadcast bus which performs a unique round-robin access if a collision is detected and avoided. Note that the global bus 32 of the present invention detects and avoids collisions of data and does not destroy two (or more) messages requiring the retransmission thereof as in the prior art contention systems mentioned earlier herein. To this end, the read/-transmit circuitry portions 36, 38 of the bus 32 require incorporation of a physical link having passive and active states to support "wired-or" arbitration. In the embodiment of the present invention being built for testing by applicants, the data link protocol will be controlled by a VLSI global bus controller (GBC) 60. The description contained hereinafter contains specific reference to field lengths and word sizes with respect to that test embodiment; however, those skilled in the art will recognize that actual lengths and sizes will depend on the equipment employed in the actual building of a system. Reference should be made to FIGS. 8-10 with respect to the discussion which follows immediately hereinafter.

A global bus message 48 consists of a sequence of asynchronously transmitted 19-bit words 50. The key point here is that the message 48 is comprised of a sequence of fixed length portions instead of comprising a continuous bit steam delineated by a header block and an ending token as in the prior art. Each word 50 includes a synchronizing start bit, a 2-bit field which identifies the word type and a 16-bit information field. A complete message consists of an identification word 52, two domain destination words 54 (specifying the recipients of the message—either limited or "all"), an optional time tag word (not shown in the example), and any number of data words 56, followed by a 16-bit cyclic redundancy check (CRC) word 58, which provides a checksum of all the preceding information for message receipt checking in a manner well known in the art.

The identification word 52 incorporates a 3-bit software alterable priority field, a 12-bit hardware defined module-unique identification field, and a single contention bit, which is appended as appropriate. The domain destination words 54 can identify logical grouping of modules 30 within a cluster. The contention bit is used to implement a round-robin arbitration mechanism among the other modules when a contention has occurred.

The message identification code is used to detect and avoid collisions. Each transmitting GBC 60 both transmits and listens to the bus traffic. It transmits the next bit of its message if and only if it did not detect any discrepancies between the data transmitted and received for the previous bit. This scheme permits only the GBC 60 transmitting the message 48 with the numerically highest priority and identification to proceed with the transmission of its message Any module 30 which "collides" during the above-described bit-by-bit message identification phase, stops transmitting the balance of its message and transmits an active high "one" during the contention bit time, which is merged into the message with which it potentially collided. If the contention bit is detected by a transmitting module 30, that module 30 will abstain from transmitting again until all the remaining (lower priority) contending modules 30 are successful in acquiring the bus 32, or until the bus 32 becomes idle. Thus, it can be seen that with the unique global bus and method of operation thereof of the present invention, not only are actual undesirable collisions avoided, but, in addition, all modules 30 are guaranteed access to the bus 32 within a known finite time interval and lockout of modules 30 as possible in the prior art is absolutely avoided.

The domain destination words 54 are followed by an optional 16-bit time tag word indicating the transmitter's local broadcast time as obtained from the bus time 40. The optional time tag word is followed by one or more 16-bit data words 56. The trailing CRC word 58 is calculated over all transmitted bits (except the start bits and the contention bit).

At the end of the CRC field 58, there is an acknowledgement bit time frame 62. If any receiving module 30 has discovered a transmission error it notifies the participating modules 30 during the hardware acknowledge bit time 62. In this event, the preceding message 48 previously received is deleted by all participating modules 30, and the original transmitting module 30 reschedules the transmission of the same message. If no non-acknowledgement ("NACK") is indicated within the acknowledgment bit time frame 62, successful transmission is assumed. This, of course, is completely contrary to the prior art approach requiring active acknowledgment of successful receipt by all recipients addressed by a message. This is an important distinction because, logically, there is no difference between "no non-acknowledgment" and "all acknowledge". The use of passive acknowledgment as employed by the present invention, however, is much more efficient. Active acknowledgement on a shared medium requires time multiplexing of responses and global knowledge of at least the number of respondents. The present invention's passive approach eliminates all that.

Immediately after the reception of a word 50, all receiving modules 50 activate their local transmitter. Before the transmitting module 30 can transmit the next word 50 in the message 48, all participating modules 50 must indicate that they are ready to receive. They do so by inactivating their local transmitters. Normally, messages 48 are separated by idle periods which are at least equal to the transmission time of one word 50. As shown in FIGS. 9 and 10, when a contention is in progress, the idle period is shortened to less than one word length.

THE MESHWORK

As indicated in simplified form in FIG. 6, each module 30 includes an interface 64 to the point-to-point meshwork 34 used to transport data between modules 30. The meshwork interface 64 incorporates bi-directional ports 66 connected through a bypass switch 68. As depicted in FIG. 5, discussed briefly above, the meshwork 34 is used to interconnect the modules 30 in an arbitrary manner as best suited to the application; that is, there is no regular interconnection scheme as in prior art networks as described above. In the above-mentioned testing embodiment of applicants, a bank of seven 1-to-6 multiplexers perform the port switching and the data link utilizes source-clocked NRZ or Manchester II encoded HDLC packets. The meshwork interface 64 is shown in greater detail in FIGS. 11-15.

In applicants testing embodiment, a meshwork interface 64 consists of a least one VLSI meshwork controller 70. A meshwork controller 70, in turn, is comprised of three receivers 72, one transmitter 74, and a switch and extension section, generally indicated as 76, used to provide intercontroller connections within the meshwork interface 64. Two controllers 70 may be interconnected to obtain six non-blocking bidirectional meshwork ports as depicted in simplified form in FIG. 15. Additional ports may be obtained by connecting more than two controllers 70; however, in such case, blocking within the interface 64 is possible.

It should be noted at this point with respect to applicants' testing embodiment and the results found therefrom that the serial transmitter and receivers used are not ideal. The combination of the transmitter 74, interconnecting wire 82, and the receiver 72 can have an unequal rise and fall time. This presents a problem when transmissions must go through several modules, such as in circuit switching. With each successive module, the transmitted signal would get narrower, and the data would begin to lose its orientation with the clock as illustrated in FIG. 13. In the present invention, special repeaters 84 are used in the meshwork controller 70 to help eliminate this problem. A typical repeater 84 is shown in FIG. 14. Skewing of the clock is compensated for by transmitting the inverted version of the received clock. The effects of one node, therefore, are negated by the effects of another. Skewing of the data, with respect to the clock, is eliminated by resampling the data with the new clock.

The object of the meshwork interfaces 64 is to establish a direct connection between two modules 30 by-passing, in each case, the modules 30 along the meshwork 34 between the two ends of the connection. An end-to-end, circuit-switched connection is established initially by the originating module 30 sending an "open channel request" packet. This packet is sent by the originating module 30 to the first intermediate module 30 and contains the destination address. At the intermediate module 30, the packet is intercepted by one of the interface receivers 72. An available forwarding port is found and a connection is established between the incoming and outgoing links through the interface crossbar switch 78. The "open channel request" packet is then forwarded to the next intermediate module 30. If an intermediate module 30 determines that the appropriate output link is busy or has failed, it issues a "negative acknowledgement" message to the module 30 which made the request. The requesting module 30 can then either pause before retransmitting or send the message through an alternate path. Those skilled in the art will recognize that the foregoing description combines functions of the meshwork hardware operating in conjunction with system software. Routing and acknowledgment decisions, for example, are made in software.

When the packet reaches its destination, a "circuit established acknowledgement" is sent to the originating module 30 through the link established. Note that once a link is established, it is physically symmetric. Only the software protocol dictates the order of messages; in fact, they can be simultaneous since the link in the present invention is intended to be full duplex. Once the link is established, the originating module 30 is free to transmit its data. Upon receipt of the data, the destination module 30 checks the data integrity and sends an acknowledgement to the source module 30. The circuit is maintained until one of the linked modules 30 issues a "BREAK" signal, which propagates to all intermediate modules 30. Within each interface 64 there is a completion monitor 80 which watches for the BREAK signal. When it is sensed, the connection at the local crossbar switch 78 is disconnected, thereby breaking the circuit from end to end.

THE DISTRIBUTED OPERATING SYSTEM

The operating system is designed to support the unique dataflow architecture of the present invention wherein, as previously mentioned, moving portions 44 of tokens 42 are employed to indicate the locations and vital characteristics of data and function resident portions 46 distributed throughout the system and the modules 30 thereof. The operating system of the present invention is a layered system consisting of a multi-tasking, event-driven kernel, a data manager, and a graph execution manager. The operating system resides in each module. There is no central controller in the system. As mentioned earlier but worthy of note once again, this is a major point of novelty over prior art approaches to the problems solved by the present invention. The use of a fully distributed and autonomous operating system makes graceful degradation a virtually inherent feature rather than a complex "add-on".

The kernel supports standard features such as creation and deletion of processes, inter-process communication, priority scheduling, time event management, and related functions. The kernel is augmented with routines for input and output, communications, and interrupt handling. The data manager supports sequentially structured data. It provides a virtual access for local processes to all token sets distributed throughout a cluster The graph execution manager schedules dataflow tasks within its module 30. It evaluates firing rules and executes tasks based on the locality of tokens and on function priority. Cooperation among the modules 30 is accomplished through use of the global bus 32. Global token status is broadcast via the global bus 32 and is redundantly maintained in each module 30.

The graph execution manager creates process templates within which functions are executed. These templates may be given different priority levels under the kernel multitasking system. Efficient dataflow graph execution requires a method of limiting token accumulation. Also, the resolution of recursive evaluations, and intelligent scheduling, need to be efficiently managed. Assigning priorities to graph nodes provides a mechanism for these purposes. The priority system allows other processing to occur in the intervals during which tokens may be en route to a temporarily blocked high priority node. Input and output from a dataflow graph is handled by system calls from the node function programs.

The operating system executes multiple dataflow graphs which may be independent or may exchange tokens. In addition, dataflow graphs are divided into subgraphs to aid software modularity, fault protection, and efficient load distribution. Each subgraph is assigned to a domain consisting of one or more of the cluster's modules 30. A particular module 30 may execute more than one subgraph and may be a member of more than one domain. Each global bus message 48 identifies the domain(s) to which it is directed as previously discussed. Only those modules 30 assigned to such domains) accept the message 48. Global bus messages may also be directed to other clusters via the meshwork 34 connecting the clusters.

A graph "node" (as opposed to the concept of a computer being a "node" in token ring networks, and the like) may be either a function or another graph. A node is a self-contained function written in any language. Tokens 42 may not be modified by the function. No reference is made within the function code to the dataflow graph of which it is a part nor to the identity or tag of any tokens 42 used or produced. Thus any function may be used at more than one node in a graph, and even in other graphs. A graph which is referenced as a node in one or more other graphs has external input and output arcs. These arcs connect to arcs in the referencing graph(s). A referenced graph is defined as either queuing or non-recursive.

Recursive graphs are separately instantiated on each reference to them in other graphs. They will behave as if a copy of them were included in each graph referencing them. A recursive graph may reference itself, although in this case there can be no loops in the graph. The recursion is stopped when an instantiation of the graph does not output any tokens to itself.

Queuing graphs are instantiated only once in the system. Such graphs have a single input node and a single output node. There may be an arbitrary graph between these nodes. The input node is fireable when tokens 42 received from a referencing graph satisfy its firing rules. The firing rules are evaluated separately for each reference from other graphs. Each firing of the input node must cause exactly one firing of the output node so that the output tokens can be routed back to the graph whose tokens caused the input node's firing. Queuing graphs provide an efficient, transparent mechanism for sharing large data structures.

The code which implements a function at a graph node is itself a token. Each node has an input arc from which it receives this code as a token 42. This feature has several advantages and it is a substantial and major point of novelty of the present invention. First, the migration of code (for functions) and data may be handled by the same software mechanisms. It may be more efficient in some cases to move the code to the data than the data to the code. Treating data and code equivalently allows the design of allocation heuristics which can exploit this option. Thus, the dynamic allocation of tasks to modules 30 for load balancing is handled efficiently without need of special mechanisms as employed and necessary in the prior art. The integrity of all transferred tokens 42 is guaranteed by the error protection features of the meshwork 34.

Second, checkpointing the state of the system is just a matter of capturing its tokens 42, for this also captures the code. An interrupted task is resumed by reloading a checkpointed collection of tokens 42. An overlay may be produced by replacing code tokens that are no longer required with new tokens.

In long-duration space missions, updates to an executing program (known as patches) may be necessary. In a system according to the present invention, "patching" merely consists of replacing a code token 42. This is accomplished without regard to disturbing proper software execution because node firings are atomic It is worthy of note at this point, at least in passing, that the atomicity of node firings in the present invention (i.e. how input tokens are consumed, the node function is evaluated, and output tokens are created, all in one. non-divisible operation) is accomplished with global bus message processing and token management techniques which are beyond the scope of the present discussion.

A graph node becomes executable when the tokens 42 at its inputs satisfy the node's firing rules. High-resolution dataflow systems have simple firing rules since nodes have few inputs and there are simple functions at each node. The low-resolution dataflow system of the present invention allows more inputs to a node and has a versatile set of firing rules. The graphical description of a dataflow graph is simplified and execution efficiency improved by allowing token merging and selection to occur at node inputs rather than requiring separate nodes for such operations. Similarly, the output tokens 42 from a node may be automatically duplicated onto several output arcs without the use of duplication nodes.

In the present invention, the inputs to a node are logically arranged into groups. Each of the inputs to a group is either a normal consumable arc, a non-consumable arc, or a round-robin collection of arcs. A node is fireable when the firing rules for each of its input groups are satisfied. After a token on a normal consumable arc is assigned to a node firing, it is unavailable for subsequent node firings and will be consumed when the node firing completes. After a token on a non-consumable arc is assigned to node firing, it remains on the arc and is available for subsequent node firings. An input with a round-robin collection of arcs feeding it has a token 42 available whenever there is a token 42 on any of its arcs. The arcs are linked in a ring with equal priority given to each arc. After a token 42 from one of the arcs is assigned to a node firing, the other arcs will be checked for tokens 42 to assign to subsequent node firings. Thus, an arc that always has tokens 42 on it cannot block tokens 42 on other arcs. The individual arcs in a round-robin collection are either consumable or non-consumable. The simplest input group is a single input (which may be a round-robin collection). There must be a token 42 at the input for its node to be fireable.

A "merge" group is a set of two or more input arcs whose firing rules are satisfied whenever at least one of the input arcs has a token 42. These input arcs are given unique priorities. If more than one input arc has a token 42 when the node is fired, only the token 42 from the highest priority arc is assigned to the node firing. Other tokens 42 remain available for subsequent firings. A token 42 is blocked and will not be used as long as there are tokens 42 on higher priority arcs. Each of the input arcs to a merge group may be consumable, non-consumable or a round-robin collection.

A "select" group is a set of two or more input arcs with a select-control input arc. Tokens 42 on the select-control arc have integer values which select one of the group's input arcs. The group's firing rules are satisfied when there is a token 42 on the select-control arc and on the selected arc. When the node is fired, both the select-control token 42 and the selected token 42 are assigned to the firing. The input and select-control arcs in a merge group may be consumable, non-consumable or round-robin collections.

In a system according to the present invention, fault protection is entirely a matter of preserving tokens 42. As with graceful degradation, this makes fault protection easy instead of complex. Tokens 42 may be lost, or damaged, or extraneous tokens 42 may be generated. The only other matter of concern is the integrity of I/O. Successfully dealing with these problems will make the system fault tolerant. In applications requiring a modest level of fault protection, occasional checkpointing and rollback recovery techniques may be adequate. When greater levels of protection are needed, "voting" is required and can be implemented easily within the operating environment of the present invention. Redundant subgraphs are scheduled on separate modules in order to generate independent results. Redundant graph nodes which have identical input data should produce identical tokens 42. In applicants' testing embodiment, at selectable points in the redundant subgraphs, the operating system will vote on the checkwords of corresponding tokens 42. Damaged or missing tokens 42 will be detected with high probability.

When noisy inputs from redundant hardware need to be voted, the voting is done within a redundantly executed graph node. Each instantiation of the voting node receives all of the redundant hardware inputs. Thus, each voting node should produce identical output tokens 42, allowing the operating system to do all further software voting based on checkwords.

In a dual redundant system the detection of an error is sufficient to indicate a fault in one of the modules 30, but does not provide the means for isolation and recovery. This is adequate for systems having the requirement to halt when an error is detected. Coupled with checkpointing, this may be sufficient for functions which require correct results, but not in a time critical fashion. When timely automatic recovery is required, dual redundancy is not sufficient. A triply redundant system in which three sets of tokens 42 are exchanged provides the means to detect damaged, lost or extraneous tokens 42. .Through voting, it also makes possible the regeneration and repair of token sequences. Other functions can continue while recovery processes work to isolate and remove the source of error. Even higher levels of fault coverage are possible by extending voting to four or more redundant inputs. It should also be noted that varying levels of coverage can be applied to different graph nodes. Overhead for redundancy need only be paid for critical functions. This is a novel fault tolerance feature of the present invention.

The hardware features provided in applicants' testing embodiment of the present invention to support fault tolerance include a fail-safe identification system on all inter-module communications and interface circuits designed to restrict hardware faults to a single module 30 or communication link. The inter-module communication protocol guarantees error-free transmission. The alteration of routing algorithms to avoid faulty transmission links is permitted. Also, modules 30 have independent clocks and power supplies. These mechanisms are the basis for the present invention's approach to fault tolerance.

We claim:

1. A computer system comprising:
   (a) a plurality of computers, each said computer having first input/output interface means to a communicatiosn network and second input/output interface means for interfacing a communications network, each said second input/output interface means including bypass means for bypassing the associated said computer with a bit stream of data passing through said second input/output interface means;
   (b) global communications network means interconnecting respective ones of said first input/output interface means for providing respective ones of said computers with the ability to broadcast messages simultaneously to the remainder of said computers; and,
   (c) meshwork communications network means interconnecting respective ones of said second input/output interface means for providing respective ones of said computers with the ability to establish a communications link with another of said computers through said bypass means of the remainder of said computers; and wherein,
   (d) communications between respective ones of said computers includes the use of split tokens each having a moving first portion which is sent from computer to computer and a resident second portion which is disposed in the memory of at least one of said computers and wherein the storage location address of said second portion is contained within said first portion.

2. The computer system of claim 1 wherein:
said split tokens represent both functions to be executed by said computers and data to be employed in the execution of said functions.

3. The computer system of claim 1 wherein:
said first input/output interface means each includes detecting and terminating means for detecting a collision between messages being broadcast over said global communications network means and for terminating the broadcasting of a message in favor of a message with superior right to the use of said global communications network means whereby collisions between messages from a plurality of said computers are detected and avoided, said detecting a terminating means comprising:
   said messages broadcast by said computers over said global communications network means each including a leading module identifying portion, and
   each said first input/output interface means including means for testing the last bit broadcast contents of said global communications network means as message from its associated said computer are being broadcast over said global communications network means on a bit-by-bit basis and for terminating the broadcasting of a message when said last bit broadcast contents of said global communications network means is not identical to the previous bit of the message just broadcast by said first input/output interface means indicating that another said computer was first in time on said global communications network means.

4. The computer system of claim 3 wherein additionally:
  said messages broadcast by said computers over said global communications network means each include a priority code preceding a module identifying portion whereby another said computer which was first in time on said global communications network means will automatically relinquish said global communications network means to the message of another said computer which is of a higher priority.

5. The computer system of claim 3 wherein additionally:
  (a) said messages broadcast by said computers over said global communications network means each include a reserved portion of fixed length and normally containing no data immediately following said module identifying portion;
  (b) said first input/output interface means at each said computer includes first logic means for broadcasting a data bit over said global communications network means during said reserved portion when it has terminated the sending of a message as a result of a detected collision; and,
  (c) said first input/output interface means at each said computer further includes second logic means for testing said global communications network means during said reserved portion and for not immediately broadcasting a new message following the termination of a broadcast message when said data bit is detected during said reserved portion whereby a said computer which has control of said global communications network means will relinquish said global communications network means for a message of another said computer which has previously relinquished said global communications network means whereby computer lockout from access to said global communications network means is prevented and equal access to all said computers is guaranteed.

6. The computer system of claim 1 wherein:
  (a) said messages broadcast by said computers over said global communications network means each include a cyclic redundancy check code for the preceding bits and a trailing portion of fixed length and normally containing no data;
  (b) said first input/output interface means at each said computer includes third logic means for testing each said message as received by means of said cyclic redundancy check code and for broadcasting a data bit over said global communications network means during said trailing portion if a said received message is in error; and,
  (c) said first input/output interface means at each said computer further includes fourth logic means for testing said global communications network means during said trailing portion and for rebroadcasting its last broadcast message as not having been received if it senses said data bit during said trailing portion.

7. The computer system of claim 1 wherein:
  (a) said bypass means of said second input/output interface means at each said computer includes a receiver for receiving inputs to the associated said computer, a transmitter for transmitting outputs from the associated said computer, a plurality of inputs and outputs connected to respective ones of said inputs and outputs of others of said computers interconnected by said meshwork communications network means, and crossbar switch means interconnecting said inputs and said outputs for bypassing said receiver and said transmitter at the associated said computer and for interconnecting one of said plurality of inputs to one of said plurality of outputs whereby a bypass link between said ones of said plurality of inputs and outputs is established.

8. The computer system of claim 7 wherein:
  said bypass means of said second input/output interface means at each said computer includes means for sensing a unique signal on said meshwork communications network means indicating that said bypass link is to be terminated and for causing said crossbar switch means to open said bypass link when said unique signal is sensed.

9. The computer system of claim 7 wherein:
  said bypass means of said second input/output interface means at each said computer includes repeater means for inverting the clock pulses passing through said crossbar switch means and for resampling data passing therethrough with said inverted clock pulses whereby narrowing of data pulses and loss of synchronization between data passing therethrough and the clock pulses associated therewith is eliminated.

10. A communications network system with the capability of sensing and avoiding message collisions for interconnecting a plurality of computers comprising:
  (a) each computer having input/output interface means for interfacing to a communications network;
  (b) global communications network means interconnecting respective ones of said input/output interface means for providing respective ones of said computers with the ability to broadcast messages simultaneously to the remainder of said computers; and,
  (c) detecting and terminating means included as part of each said input/output interface means for detecting a collision between messages being broadcast over said global communications network means and for terminating the broadcasting of a message in favor of a message with superior right to use of said global communications network means whereby collisions between simultaneous messages from a plurality of the computers are detected and avoided; and wherein,
  (d) the messages broadcast by the computers over said global communications network means each includes a leading module identifying portion;
  (e) said first input/output interface means each includes means for testing the last bit broadcast contents of said global communications network means as messages from its associated computer are being broadcast serially over said global communications network means on a bit-by-bit basis and for terminating the broadcasting of a message when said last bit broadcast contents of said global communications network means is not identical to the previous bit of the message just broadcast by said first input/output interface means thus indicating that another computer was first in time on said global communications network means; and,
  (f) the messages broadcast by the computers over said global communications network means each include a leading priority code preceding said module identifying portion whereby another computer which was first in time on said global communications network means will relinquish said global communications network means to the message of another computer which is of a higher priority.

11. The computer system of claim 10 wherein additionally:
(a) the messages broadcast by the computers over said global communications network means each include a fixed length non-data portion immediately following said module identifying portion;
(b) said first input/output interface means at each computer includes first logic means for broadcasting a data bit over said global communications network means during said fixed length immediately following non-data portion when it has terminated the sending of a message as a result of a detected collision; and,
(c) said first input/output interface means at each computer further includes second logic means for testing said global communications network means during said fixed length immediately following non-data portion and for not immediately broadcasting a new message following the termination of a broadcast message when said data bit is detected during said fixed length immediately following non-data portion whereby a computer which has control of said global communications network means will relinquish said global communications network means to the message of another computer which has previously relinquished said global communications network means whereby computer lockout from access to said global communications network means is prevented and equal access to all the computers is guaranteed.

12. The computer system of claim 10 wherein:
(a) the messages broadcast by the computers over said global communications network means each include a cyclic redundancy check code for the preceding bits and a fixed length trailing non-data portion;
(b) said first input/output interface means at each computer includes third logic means for testing each message as received by means of said cyclic redundancy check code and for broadcasting a data bit over said global communications network means during said fixed length trailing non-data portion; and,
(c) said first input/output interface means at each computer further includes fourth logic means for testing said global communications network means during said fixed length trailing non-data portion and for rebroadcasting its last broadcast message as not having been received if it senses said data bit during said fixed length trailing non-data portion.

13. A computer system comprising:
(a) a plurality of computers wherein each said computer is controlled by a resident copy of a common operating system; and,
(b) communications network means interconnecting respective ones of said computers for allowing respective ones of said computers to broadcast messages to all others of said computers simultaneously and for allowing respective ones of said computers to transmit and receive data and functions to and from others of said computers; wherein,
(c) the initiation of functions within respective ones of the computers is accomplished by the broadcasting of function tokens as messages on said communications network means; and,
(d) communication and transfer of both functions and data between respective ones of said computers is by means of split tokens each having a moving first portion which is moved from computer to computer and a resident second portion which is disposed in the memory of at least one of said computers and wherein the location of said second portion is part of said first portion.

14. The computer system of claim 13 wherein:
(a) selected ones of said function tokens are duplicate tokens which cause the associated function to be accomplished on at least two separate ones of said computers; and,
(b) said common operating system at each said computer includes logic for sensing duplicate tokens, for voting on the results produced by the associated function at each of said at least two separate ones of said computers, and for selecting the said results with the highest probability of being correct for use as the results of said associated function.

15. The computer system of claim 13 wherein:
said broadcasting of said function tokens is initiated by the broadcasting of data tokens required for the performance of a function as messages on said communications network means.

16. The computer system of claim 13 wherein:
ones of said function tokens have a time of execution associated with them and said broadcasting of said function tokens is initiated by the associated said time of execution being reached.

17. The computer system of claim 16 wherein:
said communications network means maintains a common system time employed by said computers connected thereto for time based activities and the time stamping of said tokens.

18. The computer system of claim 13 wherein: 'said moving firs portion of said split tokens is broadcast over said communications network means to all said computers simultaneously and said resident second portion is transferred over said communications network means from one said computer to another.

19. The computer system of claim 13 wherein:
(a) each said computer has first input/output interface means for interfacing to a communications network and second input/output interface means for interacting to a communications network, each said second input/output interface means including bypass means for bypassing the associated said computer with a bit stream passing through said second input/output interface means; and wherein said communications network means comprises:
(b) global communications network means interconnecting respective ones of said first input/output interface means for providing respective ones of said computers with the ability to broadcast messages simultaneously to the remainder of said computers; and,
(c) meshwork communications network means interconnecting respective ones of said second input/output interface means for providing respective ones of said computers with the ability to establish a communications link with another of said computers through said bypass means of the remainder of said computers.

20. The computer system of claim 19 wherein:

said first input/output interface means each includes detecting and terminating means for detecting a collision between messages being broadcast over said global communications network means and for terminating the broadcasting of a message in favor of a message with superior right to use of said global communications network means whereby collisions between messages form a plurality of said computers are detected and avoided, said detecting and terminating means comprising, said messages broadcast by said computers over said global communications network means each including a leading module identifying portion; and, said first input/output interface means each including means for testing the last bit broadcast contents of said global communications network means as messages from its associated said computer are being broadcast over said global communications network means on a bit-by-bit basis and for terminating the broadcasting of a message when said last bit broadcast contents of said global communications network means is not identical to the previous bit indicating that another said computer was first in time on said global communications network means.

21. The computer system of claim 20 wherein additionally:

said messages broadcast by said computers over said global communications network means each include a priority code preceding said module identifying portion whereby another said computer which was first in time on said global communications network means will automatically relinquish said global communications network means to the message of another said computer which is of a higher priority.

22. The computer system of claim 20 wherein additionally:

(a) said messages broadcast by said computers over said global communications network means each include a fixed length non-data portion immediately following said module identifying portion;

(b) said first input/output interface means at each said computer includes first logic means for broadcasting a data bit over said global communications network means during said fixed length immediately following non-data portion when it has terminated the sending of a message as a result of a detected collision; and, (c) said first input/output interface means at each said computer further includes second logic means for testing said global communications network means during said fixed length immediately following non-data portion and for not immediately broadcasting a new message following the termination of a broadcast message when said data bit is detected during said fixed length immediately following non-data portion whereby a said computer which has control of said global communications network means will relinquish said global communications network means for the message of another said computer which has previously relinquished said global communications network means whereby computer lockout from access to said global communications network means is prevented and equal access to all said computers is guaranteed.

23. The computer system of claim 19 wherein:

(a) said messages broadcast by said computers over said global communications network means each include a cyclic redundancy check code for the preceding bits and a fixed length trailing non-data portion;

(b) said first input/output interface means at each said computer includes third logic means for testing each said message as received by means of said cyclic redundancy check code and for broadcasting a data bit over said global communications network means during said fixed length trailing non-data portion as a result of messages received with errors; and, (c) said first input/output interface means at each said computer further includes fourth logic means for testing said global communications network means during said fixed length trailing non-data portion and for rebroadcasting its last broadcast message as not having been received if it senses said data bit during said fixed length trailing non-data portion.

24. The computer system of claim 20 wherein:

(a) said bypass means of said second input/output interface means at each said computer includes a receiver for receiving inputs to the associated said computer, a transmitter for transmitting outputs from the associated said computer, a plurality of inputs and outputs connected to respective ones of said inputs and outputs of others of said computers interconnected by said meshwork communications network means, and crossbar switch means interconnecting said inputs and said outputs for bypassing said receiver and said transmitter at the associated said computer and for interconnecting one of said plurality of inputs to one of said plurality of outputs whereby a bypass link between said ones of said plurality of inputs and outputs is established.

25. The computer system of claim 24 wherein:

said bypass means of said second input/output interface means at each said computer includes means for sensing a unique signal on said meshwork communications network means indicating that said bypass link is to be terminated and for causing said crossbar switch means to open said bypass link when said unique signal is sensed.

26. The computer system of claim 24 wherein:

said bypass means of said second input/output interface means at each said computer includes repeater means for inverting the clock pulses passing through said crossbar switch means and for resampling data passing therethrough with said inverted clock pulses whereby narrowing of data pulses and loss of synchronization between data passing therethrough and the clock pulses associated therewith is eliminated.

27. A computer interconnecting system for interconnecting a plurality of computers for the transfer of data systems therebetween comprising:

(a) each computer having input/output interface means for interfacing to a communications network, each said input/output interface means including bypass means for bypassing the associated computer with a bit stream passing through said input/output interface means;

(b) meshwork communications network means interconnecting respective ones of said input/output interface means for providing respective ones of the computers with the ability to establish a communications link with another of the computers through said bypass means of the remainder of the computers;

(c) said bypass means of said input/output interface means at each computer including a receiver for receiving inputs to the associated computer, a transmitter for transmitting outputs from the associated computer, a plurality of inputs and outputs connected to respective ones of said inputs and outputs of others of the computers interconnected by said meshwork communications network means, crossbar switch means interconnecting said inputs and said outputs for bypassing said receiver and said transmitter at the associated computer and for interconnecting one of said plurality of inputs to one of said plurality of outputs whereby a bypass link between said ones of said plurality of inputs and outputs is established;

(d) said bypass means of said input/output interface maens at each computer includnig means for sensing a unique signal on said meshwork communications network means indicating that said bypass link is to be terminated and for causing said crossbar switch means to open said bypass link when said unique signal is sensed; and, (e) said bypass means of said input/output interface means at each computer further including repeater means for inverting the clock pulses passing through said crossbar switch means and for resampling data passing therethrough with said inverted clock whereby narrowing of data pulses and loss of synchronization between data passing therethrough and the clock pulses associated therewith is eliminated.

28. In a computer system comprising a plurality of computers and a communications network interconnecting respective ones of the computers for allowing respective ones of the computers to broadcast messages to all the computers simultaneously and for allowing respective ones of the computers to transmit and receive data and function initiations to and from others of the computers, the improvement comprising:

(a) each computer being controlled by a resident copy of a common operating system; and, (b) the initiation of functions within respective ones of the computers being accomplished by the broadcasting of function tokens as messages on the communications network means; and wherein, (c) communication and transfer of both function tokens and data between respective ones of the computers is by means of split tokens each having a moving first portion which is transmitted as a message from computer to computer and a resident second portion which is disposed in the memory of at least one of said computers and wherein the location address of said second portion is contained in said first portion.

29. The improvement to a computer system of claim 28 wherein:

(a) selected ones of said function tokens are duplicate tokens which cause the associated function to be executed in at least two separate ones of the computers; and, (b) said common operating system at each computer includes logic for sensing duplicate tokens, for voting on the results produced by the associated function at each computer, and for selecting for use the said results with the highest probability of being correct.

30. The improvement to a computer system of claim 28 wherein:

said broadcasting of said function tokens is initiated by the broadcasting as messages on the communications network of data tokens required for the performance of a function.

31. The improvement to a computer system of claim 28 wherein:

selected ones of said function tokens have a time of execution associated with them and said broadcasting of said function tokens is initiated by the associated said time of execution being reached.

32. The improvement to a computer system of claim 31 wherein:

the communications network includes means for maintaining a common system time employed by the computers for time based activities and the time stamping of said tokens.

33. The improvement to a computer system of claim 28 wherein:

said moving first portion of said split tokens is broadcast over said communications network means to all said computers simultaneously and said resident second portion is transferred over the communications network only between a computer wherein it is resident and a computer requiring it to execute a function.

* * * * *